United States Patent

Yao et al.

[11] Patent Number: 5,983,099
[45] Date of Patent: Nov. 9, 1999

[54] METHOD/APPARATUS FOR AN ACCELERATED RESPONSE TO RESOURCE ALLOCATION REQUESTS IN A CDMA PUSH-TO-TALK SYSTEM USING A CDMA INTERCONNECT SUBSYSTEM TO ROUTE CALLS

[75] Inventors: Yu-Dong Yao, San Diego; Matthew S. Grob, La Jolla; Eric J. Levken, Carlsbad; Katherine W. White, San Diego, all of Calif.

[73] Assignee: Qualcomm Incorporated, San Diego, Calif.

[21] Appl. No.: 08/661,690

[22] Filed: Jun. 11, 1996

[51] Int. Cl.[6] ............................. H04B 1/00; H04B 7/00
[52] U.S. Cl. ......................... 455/426; 455/509; 455/518
[58] Field of Search ..................... 455/54.1, 54.2, 455/33.1, 53.1, 34.1, 89, 426, 507, 509, 516, 518, 520, 519; 370/441, 431

[56] References Cited

U.S. PATENT DOCUMENTS

| | | | |
|---|---|---|---|
| 4,644,560 | 2/1987 | Torre et al. | 375/1 |
| 4,817,190 | 3/1989 | Comroe et al. | 455/11 |
| 4,821,310 | 4/1989 | Lynk, Jr. et al. | 379/63 |
| 4,833,701 | 5/1989 | Comroe et al. | 379/60 |
| 4,901,307 | 2/1990 | Gilhousen et al. | 370/18 |
| 5,014,345 | 5/1991 | Comroe et al. | 455/54 |
| 5,056,109 | 10/1991 | Gilhousen et al. | 375/1 |
| 5,095,529 | 3/1992 | Comroe et al. | 455/16 |
| 5,131,038 | 7/1992 | Puhl et al. | 380/23 |
| 5,179,721 | 1/1993 | Comroe et la. | 455/33.1 |
| 5,267,261 | 11/1993 | Blakeney, II et al. | 375/1 |
| 5,299,199 | 3/1994 | Wilson et al. | 370/95.3 |
| 5,325,432 | 6/1994 | Gardeck et al. | 380/21 |
| 5,369,781 | 11/1994 | Comroe et al. | 455/15 |
| 5,371,898 | 12/1994 | Grube et al. | 455/33.1 |
| 5,387,905 | 2/1995 | Grube et al. | 340/825.52 |
| 5,420,909 | 5/1995 | Ng et al. | 379/58 |
| 5,423,066 | 6/1995 | Sasuta | 455/34.1 |
| 5,440,544 | 8/1995 | Zinser, Jr. | 370/50 |
| 5,450,405 | 9/1995 | Maher et al. | 370/58.2 |
| 5,455,003 | 10/1995 | Erving et al. | 379/418 |
| 5,463,617 | 10/1995 | Grube et al. | 370/29 |
| 5,465,391 | 11/1995 | Ioyryla | 455/33.4 |
| 5,471,645 | 11/1995 | Felix | 455/34.2 |
| 5,473,605 | 12/1995 | Grube et al. | 370/62 |
| 5,491,835 | 2/1996 | Sasuta et al. | 455/34.1 |
| 5,511,232 | 4/1996 | O'Dea et al. | 455/54.1 |
| 5,513,381 | 4/1996 | Sasuta | 455/34.1 |
| 5,539,730 | 7/1996 | Dent | 370/29 |
| 5,542,108 | 7/1996 | Sasuta | 455/34.1 |
| 5,566,168 | 10/1996 | Dent | 370/50 |
| 5,572,201 | 11/1996 | Graham et al. | 340/902 |
| 5,594,948 | 1/1997 | Talarmo et al. | 455/54.2 |
| 5,634,197 | 5/1997 | Paavonen | 455/58.1 |

FOREIGN PATENT DOCUMENTS

| | | | |
|---|---|---|---|
| 0584904 | 3/1994 | European Pat. Off. | H04Q 7/00 |
| 2290196 | 12/1995 | United Kingdom | H04B 7/26 |
| 9512296 | 5/1995 | WIPO | H04Q 7/38 |
| 9600482 | 1/1996 | WIPO | H04Q 7/28 |

*Primary Examiner*—Douglas W. Olms
*Assistant Examiner*—David R Vincent
*Attorney, Agent, or Firm*—Russell B. Miller; Thomas M. Thibault

[57] ABSTRACT

In a push-to-talk dispatch system, a method and apparatus for providing an accelerated response to a push-to-talk origination message. A first base station allocates a first set of equipment to support a push-to-talk connection. A first system controller allocates a second set of equipment to support the push-to-talk connection. Upon receipt of a push-to-talk origination message from a first remote unit, the first base station transmits an immediate response to the first remote unit, instructing it to communicate through the first set of equipment and the second set of allocated equipment.

17 Claims, 2 Drawing Sheets

METHOD/APPARATUS FOR AN ACCELERATED RESPONSE TO RESOURCE ALLOCATION REQUESTS IN A CDMA PUSH-TO-TALK SYSTEM USING A CDMA INTERCONNECT SUBSYSTEM TO ROUTE CALLS

This invention was made with Government support under MDA904-94-C-C116 awarded by the National Security Agency.

BACKGROUND OF THE INVENTION

I. Field of the Invention

This invention relates generally to resource allocation in a dispatch system and, more particularly, to a rapid response to a resource allocation request from a remote unit.

II. Description of the Related Art

In a wireless telephone communication system, many users communicate over a wireless channel to connect to other wireless and wireline telephone systems. Communication over the wireless channel can be one of a variety of multiple access techniques. These multiple access techniques include time division multiple access (TDMA), frequency division multiple access (FDMA), and code division multiple access (CDMA). The CDMA technique has many advantages. An exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters, airborne repeaters, or terrestrial base stations using CDMA spread spectrum communication signals. In using CDMA communications, the frequency spectrum can be reused multiple times permitting an increase in system user capacity.

In the CDMA cellular system, each base station provides coverage to a limited geographic area and links the remote units in its coverage area through a cellular system switch to the public switched telephone network (PSTN). When a remote unit moves to the coverage area of a new base station, the routing of the remote unit's call is transferred to the new base station. The base station-to-remote unit signal transmission path is referred to as the forward link and the remote unit-to-base station signal transmission path is referred to as the reverse link.

In an exemplary CDMA system, each base station transmits a pilot signal having a common pseudorandom noise (PN) spreading code that is offset in code phase from the pilot signal of other base stations. During system operation, the remote unit is provided with a list of code phase offsets corresponding to neighboring base stations surrounding the base station through which communication is established. The remote unit is equipped with a searching element with which it tracks the signal strength of the pilot signal from a group of base stations including the neighboring base stations.

A method and system for providing communication with a remote unit through more than one base station during the handoff process are disclosed in U.S. Pat. No. 5,267,261, entitled "MOBILE ASSISTED SOFT HANDOFF IN A CDMA CELLULAR COMMUNICATION SYSTEM," issued Nov. 30, 1993 assigned to the assignee of the present invention. Using this system, communication between the remote unit and the end user is uninterrupted by the eventual handoff from an original base station to a subsequent base station. This type of handoff may be considered a "soft" handoff in that communication with the subsequent base station is established before communication with the original base station is terminated. When the remote unit is in communication with two base stations, the remote unit combines the signals received from each base station in the same manner that multipath signals from a common base station are combined.

In a typical macrocellular system, a system controller may be employed to create a single signal for the end user from the signals received by each base station. Within each base station, signals received from a common remote unit may be combined before they are decoded and thus take full advantage of the multiple signals received. The decoded result from each base station is provided to the system controller. Once a signal has been decoded it cannot be 'combined' with other signals. Thus the system controller must select between the plurality of decoded signals produced by each base station with which communication is established by a single remote unit. The most advantageous decoded signal is selected from the set of signals from the base stations and the unchosen signals are simply discarded.

Remote unit assisted soft handoff operates based on the pilot signal strength of several sets of base stations as measured by the remote unit. The Active Set is a set of base stations through which active communication is established. The Candidate Set is a set of base stations chosen from the Neighbor Set or the Remaining Set having a pilot signal strength at a sufficient signal level to establish communication. The Neighbor Set is a set of base stations surrounding an active base station comprising base stations that have a high probability of having a signal strength of sufficient level to establish communication. The Remaining Set comprises all base station in the system which are not members of the Active, Candidate, or Neighbor Sets.

When communication is initially established, a remote unit communicates through a first base station and the Active Set contains only the first base station. The remote unit monitors the pilot signal strength of the base stations of the Active Set, the Candidate Set, the Neighbor Set, and the Remaining Set. When a pilot signal of a base station in the Neighbor Set or Remaining Set exceeds a predetermined threshold level, the base station is added to the Candidate Set. The remote unit communicates a message to the first base station identifying the new base station. A system controller decides whether to establish communication between the new base station and the remote unit. Should the system controller decide to do so, the system controller sends a message to the new base station with identifying information about the remote unit and a command to establish communications therewith. A message is also transmitted to the remote unit through the first base station. The message identifies a new Active Set that includes the first and the new base station. The remote unit searches for the new base station transmitted information signal and communication is established with the new base station without termination of communication through the first base station. This process can continue with additional base stations.

When the remote unit is communicating through multiple base stations, it continues to monitor the signal strength of the base stations of the Active Set, the Candidate Set, the Neighbor Set, and the Remaining Set. Should the signal strength corresponding to a base station of the Active Set drop below a predetermined threshold for a predetermined period of time, the remote unit generates and transmits a message to report the event. The system controller receives this message through at least one of the base stations with which the remote unit is communicating. The system controller may decide to terminate communications through the base station having a weak pilot signal strength. The system controller upon deciding to terminate communications through a base station generates a message identifying a new Active Set of base stations. The new Active Set does not contain the base station through which communication is to be terminated. The base stations through which communication is established send a message to the remote unit. The system controller also communicates information to the base station to terminate communications with the remote unit. The remote unit communications are thus routed only through base stations identified in the new Active Set.

Because the remote unit is communicating with the end user though at least one base station at all times throughout the soft handoff process, no interruption in communication occurs between the remote unit and the end user. A soft handoff provides significant benefits in its inherent "make before break" technique over the conventional "break before make" technique employed in other cellular communication systems.

In a wireless telephone system, maximizing the capacity of the system in terms of the number of simultaneous telephone calls that can be handled is extremely important. System capacity in a spread spectrum system can be maximized if the transmission power of each remote unit is controlled such that each transmitted signal arrives at the base station receiver at the same level. In an actual system, each remote unit may transmit the minimum signal level that produces a signal-to-noise ratio that allows acceptable data recovery. If a signal transmitted by a remote unit arrives at the base station receiver at a power level that is too low, the bit-error-rate may be too high to permit high quality communications due to interference from the other remote units. On the other hand, if the remote unit transmitted signal is at a power level that is too high when received at the base station, communication with this particular remote unit is acceptable but this high power signal acts as interference to other remote units. This interference may adversely affect communications with other remote units.

Therefore to maximize capacity in an exemplary CDMA spread spectrum system, the transmit power of each remote unit within the coverage area of a base station is controlled by the base station to produce the same nominal received signal power at the base station. In the ideal case, the total signal power received at the base station is equal to the nominal power received from each remote unit multiplied by the number of remote units transmitting within the coverage area of the base station plus the power received at the base station from remote units in the coverage area of neighboring base stations.

The path loss in the radio channel can be characterized by two separate phenomena: average path loss and fading. The forward link, from the base station to the remote unit, operates on a different frequency than the reverse link, from the remote unit to the base station. However because the forward link and reverse link frequencies are within the same general frequency band, a significant correlation between the average path loss of the two links exists. On the other hand, fading is an independent phenomenon for the forward link and reverse link and varies as a function of time.

In an exemplary CDMA system, each remote unit estimates the path loss of the forward link based on the total power at the input to the remote unit. The total power is the sum of the power from all base stations operating on the same frequency assignment as perceived by the remote unit. From the estimate of the average forward link path loss, the remote unit sets the transmit level of the reverse link signal. Should the reverse link channel for one remote unit suddenly improve compared to the forward link channel for the same remote unit due to independent fading of the two channels, the signal as received at the base station from this remote unit would increase in power. This increase in power causes additional interference to all signals sharing the same frequency assignment. Thus a rapid response of the remote unit transmit power to the sudden improvement in the channel would improve system performance. Therefore it is necessary to have the base station continually contribute to the power control mechanism of the remote unit.

Remote unit transmit power may also be controlled by one or more base stations. Each base station with which the remote unit is in communication measures the received signal strength from the remote unit. The measured signal strength is compared to a desired signal strength level for that particular remote unit. A power adjustment command is generated by each base station and sent to the remote unit on the forward link. In response to the base station power adjustment command, the remote unit increases or decreases the remote unit transmit power by a predetermined amount. By this method, a rapid response to a change in the channel is effected and the average system performance is improved. Note that in a typical cellular system, the base stations are not intimately connected and each base station in the system is unaware of the power level at which the other base stations receive the remote unit's signal.

When a remote unit is in communication with more than one base station, power adjustment commands are provided from each base station. The remote unit acts upon these multiple base station power adjustment commands to avoid transmit power levels that may adversely interfere with other remote unit communications and yet provide sufficient power to support communication from the remote unit to at least one of the base stations. This power control mechanism is accomplished by having the remote unit increase its transmit signal level only if every base station with which the remote unit is in communication requests an increase in power level. The remote unit decreases its transmit signal level if any base station with which the remote unit is in communication requests that the power be decreased. A system for base station and remote unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention.

It is also desirable to control the relative power used in each data signal transmitted by the base station in response to control information transmitted by each remote unit. The primary reason for providing such control is to accommodate the fact that in certain locations the forward channel link may be unusually disadvantaged. Unless the power being transmitted to the disadvantaged remote unit is increased, the signal quality may become unacceptable. An example of such a location is a point where the path loss to one or two neighboring base stations is nearly the same as the path loss to the base station communicating with the remote unit. In such a location, the total interference would be increased by three times over the interference seen by a remote unit at a point relatively close to its base station. In addition, the interference coming from the neighboring base stations does not fade in unison with the signal from the active base station as would be the case for interference coming from the active base station. A remote unit in such a situation may require 3 to 4 dB additional signal power from the active base station to achieve adequate performance.

At other times, the remote unit may be located where the signal-to-interference ratio is unusually good. In such a case, the base station could transmit the desired signal using a lower than normal transmitter power, reducing interference to other signals being transmitted by the system.

To achieve the above objectives, a signal-to-interference measurement capability can be provided within the remote unit receiver. This measurement is performed by comparing the power of the desired signal to the total interference and noise power. If the measured ratio is less than a predetermined value, the remote transmits a request to the base station for additional power on the forward link signal. If the ratio exceeds the predetermined value, the remote unit transmits a request for power reduction. One method by which the remote unit receiver can monitor signal-to-interference ratios is by monitoring the frame error rate (FER) of the resulting signal. Another way is by measuring the number of erasures received.

The base station receives the power adjustment requests from each remote unit and responds by adjusting the power allocated to the corresponding forward link signal by a predetermined amount. The adjustment is typically small, such as on the order of 0.5 to 1.0 dB, or around 12%. The rate of change of power may be somewhat slower than that used for the reverse link, perhaps once per second. In the preferred embodiment, the dynamic range of the adjustment is typically limited such as from 4 dB less than nominal to about 6 dB greater than nominal transmit power.

The base station should also consider the power demands being made by other remote units in deciding whether to comply with the requests of any particular remote unit. For example, if the base station is loaded to capacity, requests for additional power may be granted, but only by 6% or less, instead of the normal 12%. In this regime, a request for a reduction in power would still be granted at the normal 12% change.

When the original cellular telephone licenses were issued by the government, one of the restrictions on use of the spectrum was that the carriers could not provide dispatching system services. However, because of the great advantages of the CDMA system and the inherent expense and problems of deployment and maintenance of private dispatch systems, the government is re-examining this issue. The government itself would benefit greatly from such services.

Whereas typical wireless and wireline telephone service provides point-to-point service, dispatching services provide one-to-many service. Common usage of dispatch services are local police radio systems, taxicab dispatch systems, Federal Bureau of Intelligence and secret service operations, and general military communication systems.

The basic model of a dispatch system consists of a broadcast net of users. Each broadcast net user monitors a common broadcast forward link signal. If a net user wishes to talk, he presses a push-to-talk (PTT) button. Typically the talking user's voice is routed from the reverse link over the broadcast forward link. Ideally the dispatch system allows landline and wireless access to the system.

When a remote unit which is part of a dispatch system presses the push-to-talk button, he would like to immediately begin speaking. However in conventional wireless systems, a perceptible amount of time is necessary to establish a link before the user may begin speaking. The present invention is a solution to reduce to an acceptable level the perceptible amount of time that is necessary to establish a link.

SUMMARY OF THE INVENTION

The present invention is a method and apparatus for providing an accelerated response to a push to talk origination message in a dispatch system. A set of resources in a base station and in a controller are preallocated to create a communication connection from the base station to the equipment creating the forward link broadcast signal. When a remote unit presses the push to talk button, the base station immediately responds with a page message corresponding to the preallocated path.

BRIEF DESCRIPTION OF THE DRAWINGS

The features, objects, and advantages of the present invention will become more apparent from the detailed description set forth below when taken in conjunction with the drawings wherein.

DESCRIPTION OF THE PREFERRED EMBODIMENT

Figure 1:
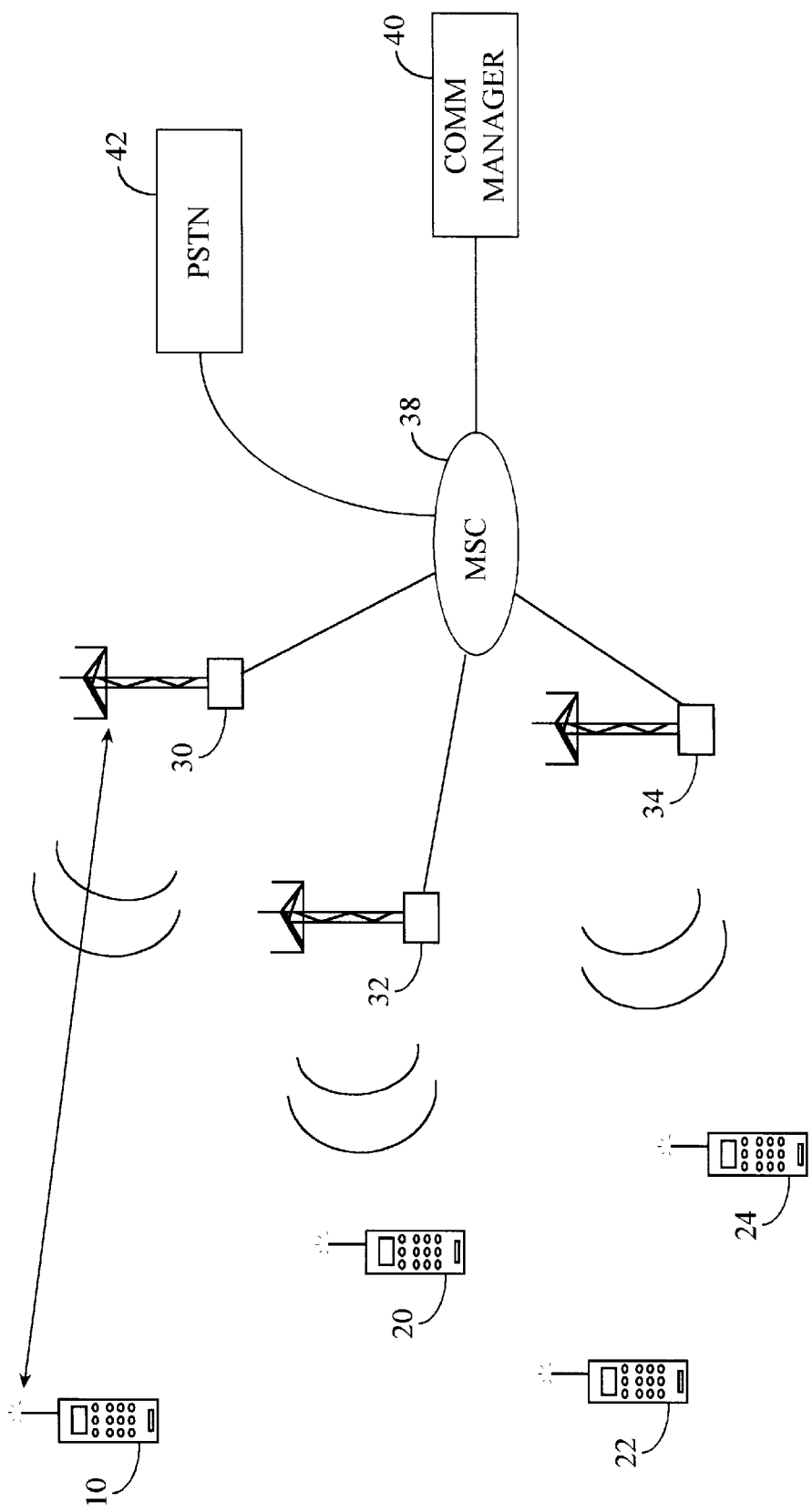
FIG. 1 shows a typical dispatch system.

FIG. 1 shows a typical dispatch system. In the preferred embodiment, remote units 10, 20, 22, and 24 may function both as dispatch units and as point-to-point telephones. In FIG. 1, remote unit 10 is currently an active talker and remote units 20, 22, and 24 are currently passive listeners. Base stations 30, 32, and 34 may provide the broadcast forward link channel to remote units 20, 22, and 24. Base station 30 connects a dedicated forward and reverse traffic channel to remote unit 10. The dedicated traffic channel is similar to the forward link broadcast channel except that, for example, remote unit 10 may receive other remote unit specific signalling information such as power control commands. The dedicated traffic channel also carries power control and signaling information. Base station 30 is also receiving a reverse link signal from active remote unit 10. In the preferred embodiment, power control on the dedicated traffic channel link with remote unit 10 is accomplished as described above. Mobile switching center (MSC) 38 coordinates the signaling to and from the base stations. Communication manager 40 controls the net such as the prioritizing of requests if two of the remote units press the 'push-to-talk' (PTT) button at the same time. In the preferred embodiment, the air interface signaling and modulation is in accordance with the Code Division Multiple Access (CDMA) system described in "Mobile Station-Base Station Compatibility Standard for Dual-Mode Wideband Spread Spectrum Cellular Systems" TIA/EIA/IS-95, generally referred to simply as IS-95. In IS-95, the remote unit is referred to as a mobile station.

It is well known in the art that base stations may be sectorized such as into three sectors. Where the term base station is used herein, it is implied that the term may refer to an entire base station or to a single sector of a multisectored base station.

In FIG. 1 active remote unit 10 has an established bidirectional link with base station 30. In order to become active, remote unit 10 sends an access channel message requesting a traffic channel to base station 30. The access message is sent on the access channel. The access channel is a reverse link channel used by remote units for communicating to the base station. The access channel is used for short signaling message exchanges such as call originations, responses to pages, and registration. An access attempt is sent by the remote unit in a series of access probes. Each access probe carries the same information but is transmitted at a higher power level than the previous one. The access probes continue until a base station acknowledgment is received at the remote unit.

The access channel is a shared slotted random access channel. Only one remote unit can successfully use the access channel at one time. Also because each successive access probe is sent at an increased power level as compared to the previous one and the access channel is not power controlled, the access channel acts as interference to the other reverse link signals. For these reasons, it is advantageous to keep the number of access attempts to a minimum.

When remote unit 10 has established a communication link, it receives the signaling of the forward broadcast channel on a dedicated forward link traffic channel. In this way, remote unit 10 does not monitor the forward link broadcast channel and receives all of the dispatch system information on its own dedicated forward link traffic channel. Remote unit 10 communicates back to base station 30 on a dedicated reverse channel. In the preferred embodiment, power control on the forward and reverse links is performed as described above in accordance with IS-95. Because remote unit 10 has its own dedicated forward link signal path, remote unit specific messaging can be included in the signaling. For example, if remote unit 10 is capable of operating both as a dispatch system remote unit and as a point-to-point telephone unit, remote unit 10 can be informed on the forward link traffic channel that an incoming point-to-point call is being directed toward remote unit 10.

On the other hand, in FIG. 1, passive remote units 20, 22, and 24 do not have an established reverse link signal to any of the base stations. Note that if remote units 20, 22 and 24 are completely passive, the individual base stations may be unaware of whether the remote units are in their corresponding coverage areas. Even if a remote unit registers with the base station when it enters the coverage area of a base station, the base station has no way of knowing when the remote unit has left the base station coverage area.

Even if remote units 20, 22 and 24 are passive, they still may use the access channel to communicate with the base stations. In the preferred embodiment, passive remote units 20, 22 and 24 use the access channel to signal the base station if they are in need of more power from the forward link broadcast channel. Within the power request access message several signal level or quality indications may be included. For example there may be a field indicating the strength at which the remote unit perceives the pilot signal from the base station.

A standard cellular system is comprised of a plurality of base stations each of which provides communication for remote units located within a limited coverage area. Together the plurality of base stations provides coverage to an entire service area. When a dispatch system is leased by a leasing party, the leasing party may wish to provide coverage over the entire service area. However, if the forward link broadcast signal is transmitted from every base station in the system at all times, the cost of the system can be quite high. A more efficient and economical manner which provides higher overall capacity for the system is to transmit the forward link broadcast channel only from those base stations in which a remote unit is located and to transmit the forward link broadcast channel at the minimum level required to provide reliable communication.

If the forward link broadcast channel is not being transmitted, the corresponding resources are available for other point-to-point or broadcast users. In addition, the other users in the coverage area of the base stations which are not transmitting the forward link broadcast channel are not subject to interference therefrom. Remember that the pilot signal is transmitted continually from each base station without regard to whether the forward link broadcast channel is being transmitted.

The present invention is a method of pre-creating a path before the push-to-talk button is pressed. The preallocated path may comprise all the resources necessary for a connection from the air interface through the switch and back to the resource which is creating the forward link broadcast channel. The preallocated path may comprise only a subset of all the resources necessary. For example typically the connection into and out of the switch can be allocated quite rapidly. Therefore, the portion of the link into and out of the switch may not need to be preallocated in order to have a sufficiently low response time. In the preferred embodiment explained below, the terminology used is associated with a specific apparatus and method for implementing the base station and mobile switching center. However, the present invention relates generally to the preallocation of resources and may be applied to a variety of different architectures and operating systems.

Figure 2:
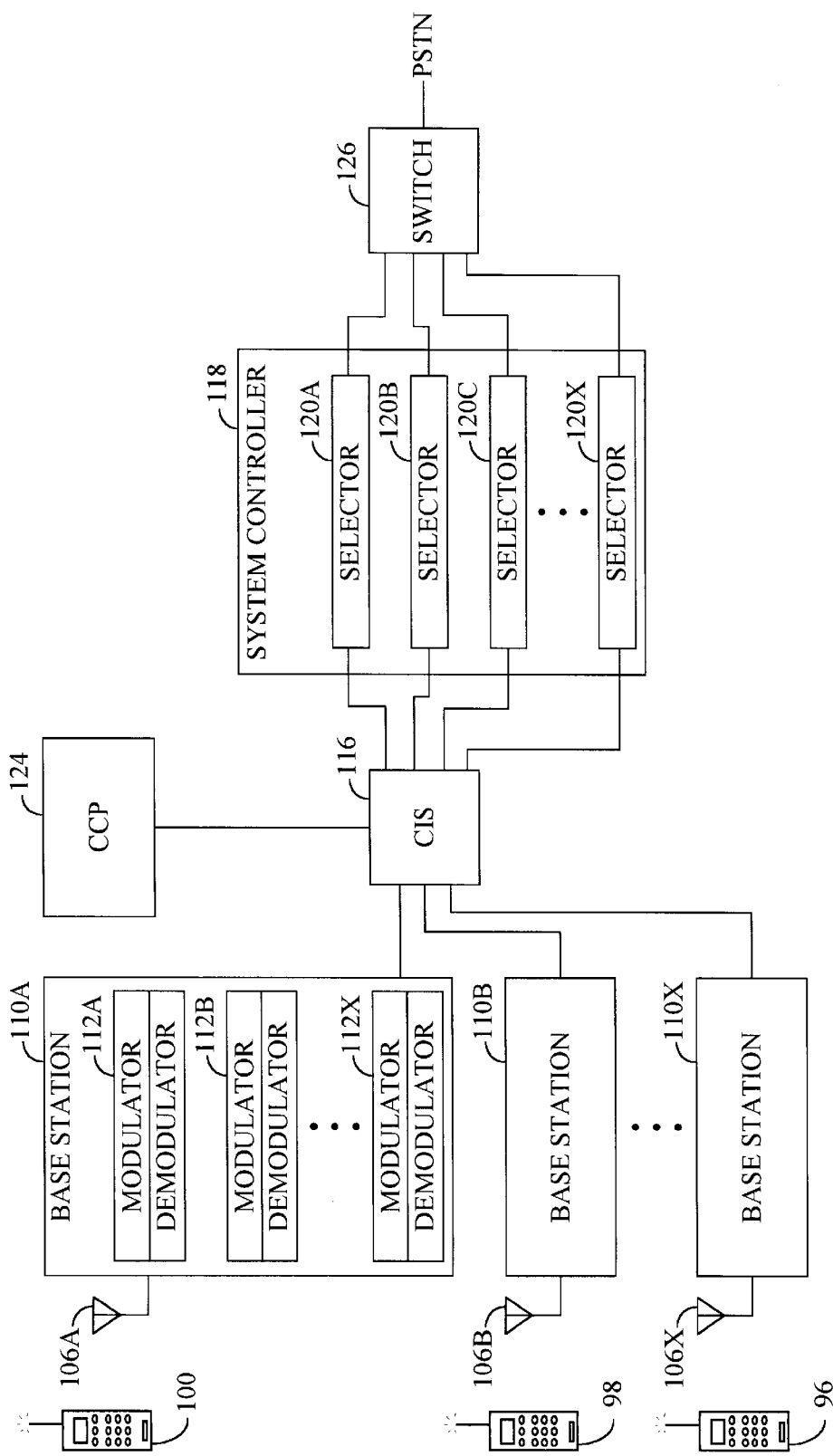
FIG. 2 shows a more detailed representation of a typical dispatch system.

When a remote unit initiates a point-to-point connection, a series of transactions must take place to allocate resources. For example FIG. 2 shows a more detailed representation of a typical dispatch system. In FIG. 2, CDMA interconnect subsystem 116, call control processor 124 and system controller 118 may be included within MSC 38 of FIG. 1. Remote unit 100 is capable of operating as both a dispatch unit and a point-to-point unit. To initiate a point-to-point connection, remote unit 100 sends an origination message on an access channel designating the identity of the remote unit, the type of service requested, and the party to whom the call should be connected. Base station 110A receives the message and sends a message to system controller 118 through CDMA interconnect subsystem 116. System controller 118 sends a message back to base station 110A which in response sends a message over the paging channel to remote unit 100 acknowledging the receipt of the access message. System controller 118 must notify call control processor (CCP) 124 which oversees the call. Call control processor 124 manages any variety of service which may be requested (for example, point-to-point, push-to-talk services, data services, or secure voice services.) Call control processor 124 allocates the system resources among the various requesting entities. Both hardware and software resources are allocated to handle the call. For example, modulator/demodulator pair 112 is allocated in base station 110A. CDMA interconnect system (CIS) 116 connects modulator/demodulator pair 112 to system controller 118. Within system controller 118, selector 120A is allocated to handle the call. From selector 120A, switch 126 is used to connect the call to the PSTN or connect the call back to system controller 118. The address designations of the allocated resources and control information must be passed among the various entities to establish a path from remote unit 100 to the PSTN. All told, more than 30 messages must be sent to establish a point-to-point traffic channel.

The communication of the messages and the allocation of resources may take from one to three seconds. For a normal point-to-point call, even a three second delay is tolerable and probably unnoticeable to the end user. Typically when a user places a point-to-point call, he must wait while the destination phone rings. An additional three seconds does not greatly effect the amount of time he must wait for an answer.

In a prior art dispatch system, when a remote unit presses the push-to-talk button initially, an analogous series of transactions must take place to allocate resources to support a connection. Contrasting the operation of a point-to-point system with the operation of a push-to-talk dispatch system, in a dispatch system when the remote unit user presses the push-to-talk button, he would like to begin talking immediately. A three second delay is not acceptable to him. A typical dispatch system specifies a maximum delay time of 300 or 400 milliseconds. But note another difference between a dispatch system and a point-to-point system. With a point-to-point connection, there is no prior knowledge of the destination of the requested connection before the call origination message is received from the remote unit. In the dispatch system the destination of the requested connection is known before the push-to-talk button is pressed. Also in a dispatch system, each passive remote unit may register and therefore when a remote unit presses the push to talk button, he is already authorized and his profile has been approved by call control processor 124.

For example, in the dispatch system of FIG. 2, assume that remote unit 98 is a member of the net and located in the coverage area of antenna 106B of base station 110B. Also assume that remote unit 96 is a member of the net and is located within the coverage area of antenna 106X of base station 11OX. Further assume that remote unit 100 is a member of the net and located within the coverage area of antenna 106A of base station 110A. Therefore it is known that the forward link broadcast channel is being transmitted from each of base stations 110A, 110B and 110X.

Further assume, for example, that a connection has been established from switch 126 through selector 120A through CIS 116 through modulator/demodulator 112A over antenna 106A to transmit the forward link broadcast channel in the coverage area of base station 110A. Because, the signal transmitted via modulator/demodulator 112A is the common forward broadcast signal only the modulator portion of modulator/demodulator 112A is in use. In the broadcast case, no corresponding broadcast return link channel is established. Therefore the demodulator portion of modulator/demodulator 112A lies idle as well as the reverse link processing components of selector 120A. Note that if more than one remote unit is monitoring the common forward link broadcast signal in the coverage area of base station 110A, each remote unit monitors the same forward link broadcast signal and additional resources are not required to support multiple remote units.

An analogous path may exist for each of remote units 96 and 98. Alternatively, because the forward link broadcast signal is the same for all passive remote units, a single selector may drive a plurality of different modulator/demodulator pairs in different base stations. For example, selector 120B may drive a modulator/demodulator in base station 110B and a modulator/demodulator in base station 110X. CIS 116 connects the signal coming from selector 120B to base stations 110B and 110X.

If remote unit 100 presses the push-to-talk button, a connection must be established from remote unit 100 to switch 126. Then the signal from remote unit 100 is routed from switch 126 back to the selector or selectors which are creating the forward link broadcast signal. Note that this path is determinable even before remote unit 100 presses the push-to-talk button.

In the most general embodiment, a dedicated path is preallocated. For example, in base station 110A, modulator/demodulator 112B is allocated and connected via CIS 116 to selector 120C. As noted above a connection may also be established from selector 120C to switch 126. An additional connection may be preallocated from switch 126 back to the selector or selectors (i.e. selector 120A and selector 120B) which are creating the forward link broadcast channel. These preallocated resources lie idle until any remote unit in the coverage area of base station 110A sends an access message designating that the push-to-talk button has been depressed. Instead of initiating the three-second-long series of transactions required to allocate a set of resources, base station 110A immediately sends a response to the remote unit on the paging channel designating the traffic channel corresponding to the preallocated resources. Immediately the preallocated forward link resources begin to send the modified forward link broadcast channel on the corresponding forward link traffic channel.

The signal transmitted to an active remote unit on a dedicated traffic channel is modified from the forward link broadcast channel in several respects. For example, an active talker may not wish to hear his own voice from the over the air connection. Also the dedicated forward traffic channel sends reverse link power control information to the remote unit as well as other signaling information. As noted above, the system operates at highest capacity when the power level from each remote unit is precisely controlled by the base station. Typically the remote units that are monitoring the forward link broadcast channel are not transmitting and therefore are not in need of reverse link power control information. The forward link signal transmitted on the dedicated traffic channel is power controlled by the active remote unit such that it is at the minimum level required for proper operation of the active remote unit.

When a remote unit presses the push-to-talk button, a set of resources is allocated as described above. When the remote unit releases the push-to-talk button, the resources remain dedicated to the remote unit for some period of time. During the time when the user is not depressing the push-to-talk button, the remote unit sends a low rate series of null messages to preserve the link power control. In this way, when the remote unit user, subsequently depresses the push-to-talk button, the link is completely established and immediately responsive. This type of operation accommodates the natural use of a dispatch system. The natural use of a dispatch system is that one remote unit initiates a dialog. After a remote unit initiates a connection, he sends a series of push-to-talk messages. When the pause between push-to-talk activations exceeds a threshold, the resources may be released. After the resources have been released, the remote unit must send an origination message on an access channel to reestablish a connection.

If there is more than one remote unit within the coverage area of base station 110A while remote unit 100 is active, a new set of preallocated resources may be established. Although it is true that at any one time only one remote unit may be talking, more than one remote unit may be active. If the immediate response of the system to an origination access message is to be preserved, a new set of resources must be allocated to accommodate a subsequent active remote unit in the same base station.

The allocation of an independent and unique set of resources for each sector of each base station which is transmitting the forward link broadcast channel consumes a substantial amount of resources. In an alternative embodiment, instead of providing an independent and unique set of resources, a variety of paths are established which overlap. For example, each of base stations 110A, 110B and 110X may each preallocate a modulator/demodulator pair. However, a single selector in system controller 118 may be assigned as the preallocated resource for each of the three connections. Only one of base stations 110A, 110B and 110X may actually assign the resource to an active remote unit. When the first one of base stations 110A, 110B and 110X assigns the preallocated resource to a remote unit connection, a new preallocated connection is established using a different selector.

A more enhanced and elegant alternative embodiment makes use of the spare demodulator associated with the modulator/demodulator pair which is providing the forward link broadcast channel. In the more enhanced and elegant alternative embodiment the following actions occur. When the forward link broadcast channel is established, a corresponding reverse link path is preallocated but idle. When a push-to-talk indication is received from a remote unit, the corresponding base station responds immediately by sending a page message. The paging message designates that the remote unit should begin transmitting on the reverse link traffic channel associated with the forward link broadcast channel. The remote unit uses the approval to become an active unit and begins to transmit immediately on the designated reverse link channel. The new active remote unit monitors the forward link broadcast channel. The base station begins to provide power control information for the remote unit on the forward link broadcast channel. Any other remote units which may be monitoring the forward link broadcast channel from this base station simply ignore the power control information because they currently have no reverse link signal to which to apply the reverse link power control commands. Meanwhile, the base station requests resources for the active remote unit through a similar process to the three-second-long process described above. When the resources become available the base station sends a channel assignment message to the remote unit over the forward link broadcast channel. The remote unit performs a channel pair switch and begins to use the new dedicated forward and reverse link traffic channel. The forward link broadcast channel need not include reverse link power control information any longer. The reverse link resources associated with the forward link broadcast channel resource are once again idle and available to service a subsequent push-to-talk origination message.

During the time that the new active remote unit is transmitting on the reverse link traffic channel associated with the forward link broadcast channel, any power control mechanism within the base station which autonomously decreases the forward link broadcast channel power level in the particular sector in which the talker is located may need to be temporarily disabled. For example, if power control is accomplished in a manner consistent with the power control mechanism described in co-pending patent application Ser. No. 08/660,618 entitled, "METHOD AND APPARATUS OF POWER CONTROL IN A CDMA DISPATCH SYSTEM" filed Jun. 6, 1996 and assigned to the assignee of the present invention, then the base station monitors an access channel for power increase commands. If a passive remote unit requires more power from the forward link broadcast channel, it transmits a power request access message to the base station on the access channel. The base station responds to the power request access message by increasing the power level of the forward link broadcast channel in the sector. If no power request access messages are received, the base station slowly decreases the power at which it transmits the forward link broadcast channel. The newly active remote unit is communicating on a traffic channel and is unable to simultaneously transmit an access message. In order to ensure that the remote unit continues to receive an adequate power level, the base station may pause the slow decrease in power during the time that the new active remote unit is transmitting on the reverse link traffic channel associated with the forward link broadcast channel. Of course, the power control process should still respond with an increase in power level if a power request access message is received from another remote unit within the same coverage area.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of providing an accelerated response to a push-to-talk origination message in a dispatch system, said dispatch system having a plurality of remote units, a plurality of base stations, and a mobile system controller, said method comprising the steps of:

pre-allocating a first set of equipment to support a push-to-talk connection at each of said plurality of base stations;

pre-allocating a second set of equipment to support said push-to-talk connection at said mobile system controller;

receiving at a first base station a push-to-talk origination message from a first remote unit; and transmitting from said first base station directly in response to said push-to-talk origination message a page to said first remote unit directing said first remote unit to establish communication through said first and second sets of equipment wherein the step of pre-allocating said second set of equipment comprises the step of pre-allocating at least one mobile system controller selector to route calls between a switch and a CDMA interconnect subsystem.

2. The method of claim 1 wherein the step of allocating said first set of equipment comprises the step of pre-selecting a modulator/demodulator in each of said plurality of base stations corresponding to a forward broadcast link and a reverse traffic link to be used for communicating with said first remote unit.

3. The method of claim 2 further comprising the step of pre-selecting a communications path from one of said pre-selected mobile system controller selectors to said switch and from a switch to at least another one of said mobile system controller selectors.

4. The method of claim 1 further comprising the step of providing a power control signal to said first remote unit.

5. An apparatus for providing an accelerated response to a push-to-talk origination message in a dispatch system, said dispatch system having a plurality of remote units, a plurality of base stations, and a mobile system controller, said apparatus comprising:

a pre-allocated first set of equipment for communicating with a first remote unit;

a pre-allocated second set of equipment to support said push-to-talk connection at said mobile system controller;

a first base station for receiving said push-to-talk origination message, and directly in response transmitting a page to said first remote unit indicative of said pre-allocated modulator/demodulator through which to communicate;

a CDMA interconnect subsystem for routing calls between said plurality of base stations and said mobile system controller;

a central call processor, located at said mobile system controller, for pre-allocating said modulator/demodulator located at each of said plurality of base stations.

6. The apparatus of claim 5 wherein said pre-allocated first set of equipment is a modulator/demodulator located at each of said base stations for providing a forward broadcast link and a reverse traffic link to said first remote unit.

7. The apparatus of claim 5 wherein said pre-allocated second set of equipment is at least one pre-allocated selector for routing calls between a switch and said CDMA interconnect subsystem.

8. The apparatus of claim 5 further comprised of a pre-allocated switch for routing communications between a first pre-allocated selector and at least one other pre-allocated selector.

9. A method of providing an accelerated response to a push-to-talk origination message in a dispatch system, said dispatch system having a plurality of remote units, a plurality of base stations, and a mobile system controller, said method comprising the steps of:

pre-allocating a first modulator/demodulator at each of said plurality of base stations for providing a forward broadcast link to said plurality of remote units and for providing a reverse traffic link to a first remote unit;

pre-allocating a first set of equipment to support said accelerated response at said mobile system controller;

receiving at a first base station said push-to-talk origination message from said a first remote unit;

transmitting from said first base station directly in response to said push-to-talk origination message a page to said first remote unit directing said first remote unit to establish a communication link through said pre-allocated first modulator/demodulator and said first set of equipment;

allocating a second modulator/demodulator at said first base station and a second set of equipment at said mobile system controller; and transferring said communication link to said second modulator/demodulator and said second set of equipment and terminating said communication link to said pre-allocated first modulator/demodulator and said first set of equipment wherein the step of pre-allocating said set of equipment comprises the step of pre-allocating at least one mobile system controller selector to route calls between a switch and a CDMA interconnect subsystem.

10. The method of claim 9 further comprising the step of pre-selecting a communications path from one of said pre-selected mobile system controller selectors to a switch and from said switch to at least another one of said mobile system controller selectors.

11. The method of claim 9 wherein the transmitting step further comprises the steps of:

sending power control information to said first remote unit using said pre-allocated modulator/demodulator; and ignoring said power control information by all of said remote units except for said first remote unit.

12. The method of claim 11 further comprising the step of sending power control information to said first remote unit using said second modulator/demodulator after said communication link has been transferred to said second modulator/demodulator and said second set of equipment.

13. The method of claim 9 wherein the transferring step further comprises:

sending a channel assignment message to said first remote unit indicative of a second modulator/demodulator through which to communicate;

switching said communication link from said pre-allocated modulator/demodulator and said first set of equipment to said second modulator/demodulator and said second set of equipment; and discontinuing power control information through first pre-allocated modulator/demodulator.

14. An apparatus for providing an accelerated response to a push-to-talk origination message in a dispatch system, said dispatch system having a plurality of remote units, a plurality of base stations, and a mobile system controller, said apparatus comprising:

a pre-allocated modulator/demodulator at each of said plurality of base stations for providing a forward broadcast link to said plurality of remote units and for providing a reverse traffic link for use by a first remote unit;

a pre-allocated set of equipment at said mobile system controller to support said accelerated response to said push-to-talk origination message;

a second modulator/demodulator, located at each of said plurality of base stations, for accepting a communication in progress between said first remote unit and said pre-allocated modulator/demodulator;

a second set of equipment at said mobile system controller for accepting said communication from said first set of equipment;

a first base station in communication with said first remote unit for requesting said second modulator/demodulator and said second set of equipment upon receipt of said push-to-talk origination message;

a central call processor for pre-allocating said pre-allocated modulator/demodulator and for allocating a second modulator/demodulator upon request from said first base station; and means for switching communications from said first modulator/demodulator and said pre-allocated set of equipment to said second modulator/demodulator and said second set of equipment wherein said pre-allocating set of equipment comprises at least one selector located at said mobile system controller for routing calls between a switch and a CDMA interconnect subsystem.

15. The apparatus of claim 11 further comprising a communications path from one of said selectors to said switch and from said switch to at least another one of said selectors.

16. The apparatus of claim 11 wherein said second set of equipment comprises at least one selector located at said mobile system controller for routing calls between a switch and a CDMA interconnect subsystem.

17. The apparatus of claim 13 further comprising a communications path from one of said selectors to said switch and from said switch to at least another one of said selectors.

* * * * *